US012755218B2

(12) United States Patent
Regikumar et al.

(10) Patent No.: US 12,755,218 B2
(45) Date of Patent: Oct. 6, 2026

(54) METHOD AND SYSTEM FOR DELAY PREDICTION FOR SCHEDULED PUBLIC TRANSPORT USING MULTI ARCHITECTURAL DEEP LEARNING

(71) Applicant: Tata Consultancy Services Limited, Mumbai (IN)

(72) Inventors: Rohith Regikumar, Chennai (IN); Priyanga Kasthurirajan, Chennai (IN); Rajesh Jayaprakash, Chennai (IN); Arvind Ramanujam, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 189 days.

(21) Appl. No.: 18/455,045

(22) Filed: Aug. 24, 2023

(65) Prior Publication Data

US 2024/0112096 A1 Apr. 4, 2024

(30) Foreign Application Priority Data

Sep. 23, 2022 (IN) ............................. 202221054665

(51) Int. Cl.
*G06Q 10/047* (2023.01)
*G06N 3/091* (2023.01)
*G06Q 50/40* (2024.01)

(52) U.S. Cl.
CPC ........... *G06Q 10/047* (2013.01); *G06N 3/091* (2023.01); *G06Q 50/40* (2024.01)

(58) Field of Classification Search
CPC .... G06N 3/0442; G06N 3/045; G06N 3/0464; G06N 3/08; G06N 3/091; G06Q 10/047; G06Q 50/40; G08G 1/0129; G08G 1/202
See application file for complete search history.

(56) References Cited

U.S. PATENT DOCUMENTS

2012/0162661 A1* 6/2012 Dagalakis .......... G01B 9/02051 356/482
2014/0169469 A1* 6/2014 Bernal ................. H04N 19/521 375/240.16

(Continued)

FOREIGN PATENT DOCUMENTS

BR 102013029822 A2 * 1/2015 ........... G06Q 10/047
CN 103903429 A * 7/2014 ............... G08G 1/00

(Continued)

OTHER PUBLICATIONS

Sinn et al., "Predicting arrival times of buses using real-time GPS measurements", 2012 15th International IEEE Conference on Intelligent Transportation Systems Anchorage, Alaska, USA. Sep. 16-19, 2012. (Year: 2012).*

(Continued)

*Primary Examiner* — Pan G Choy
(74) *Attorney, Agent, or Firm* — Finnegan, Henderson, Farabow, Garrett & Dunner, LLP

(57) ABSTRACT

The present disclosure provides a system and method for delay prediction for scheduled public transport. A multi-architectural deep learning approach has been used to predict the delays of a queried vehicle in the scheduled public transport. For this, historical operational data is transformed into temporal, and spatiotemporal data. While, the spatial data is obtained from geographical information. The system uses different combinations of neural networks architectures. A regressor model uses three separate kinds of architecture. One component is the Fully Connected Neural Network (FCNN), which is good at learning from static features, the second is the Long Short Term Memory (LSTM) network which is good at learning from temporal features, and the third is the 3D Convolutional Neural Network (3DCNN) which is good at learning from spa- (Continued)

tiotemporal features. Learned encoding from each are fed to another FCNN to produce the predicted delay value.

5 Claims, 6 Drawing Sheets

(56) References Cited

U.S. PATENT DOCUMENTS

| | | | | |
|---|---|---|---|---|
| 2015/0269491 | A1* | 9/2015 | Tripathi | G08G 1/0129 706/46 |
| 2018/0322431 | A1* | 11/2018 | Folck | G06Q 10/06316 |
| 2021/0233196 | A1* | 7/2021 | Qin | G06Q 10/1057 |

FOREIGN PATENT DOCUMENTS

| | | | | | |
|---|---|---|---|---|---|
| CN | 109426930 | A | * | 3/2019 | G06Q 10/08355 |
| CN | 109508751 | A | | 3/2019 | |
| CN | 111627239 | B | * | 8/2022 | G08G 1/123 |
| KR | 101935040 | B1 | * | 1/2019 | G06Q 50/265 |
| KR | 20240003353 | A | * | 1/2024 | G06Q 50/40 |
| LU | 501642 | B1 | * | 9/2022 | G06N 3/08 |
| WO | WO-2016174745 | A1 | * | 11/2016 | G08G 1/01 |
| WO | WO-2020205597 | A1 | * | 10/2020 | G06N 20/00 |

OTHER PUBLICATIONS

Yin et al., "A prediction model of bus arrival time at stop with multi-routes", World Conference on Transport Research—WCTR 2016 Shanghai. Jul. 10-15, 2016. ScienceDirect, Transportation Research Procedia 25 (2017) 4623-4636. (Year: 2017).*

Sun et al., "Predicting Bus Arrival Time on the Basis of Global Positioning System Data", Transportation Research Record Journal of the Transportation Research Board. Dec. 2007. (Year: 2007).*

Zhang et al., "A Prediction Model for Bus Arrival Time at Bus Stop Considering Signal Control and Surrounding Traffic Flow", DOI 10.1109/ACCESS 2020. 3004856. IEEE Access. (Year: 2020).*

Ping Huang et al. "A deep learning approach for multi-attribute data: a study of train delay prediction in railway systems," Information Sciences, Apr. 2020, vol. 516, Elsevier, https://www.researchgate.net/publication/338161719_A_deep_learning_approach_for_multi-attribute_data_A_study_of_train_delay_prediction_in_railway_systems.

Zhongcan Li et al. "Prediction of Train Arrival Delays Considering Route Conflicts at Multi-line Stations," Transportation Research Part C: Emerging Technologies, May 2022, vol. 138, Publisher: Elsevier, https://www.researchgate.net/publication/358404212_Prediction_of_Train_Arrival_Delays_Considering_Route_Conflicts_at_Multi-line_Stations.

Niklas Christoffer Petersen et al. "Multi-output bus travel time prediction with convolutional LSTM neural network," Expert Systems with Applications, Apr. 2019, vol. 120, Elsevier, https://arxiv.org/pdf/1903.02791.pdf.

* cited by examiner

METHOD AND SYSTEM FOR DELAY PREDICTION FOR SCHEDULED PUBLIC TRANSPORT USING MULTI ARCHITECTURAL DEEP LEARNING

PRIORITY CLAIM

This U.S. patent application claims priority under 35 U.S.C. § 119 to: Indian Patent Application No. 202221054665, filed on Sep. 23, 2022. The entire contents of the aforementioned application are incorporated herein by reference.

TECHNICAL FIELD

The disclosure herein generally relates to the field of public transport management, and, more particularly, to a method and system for delay prediction of a queried vehicle running in a scheduled public transport.

BACKGROUND

Public transports are the backbone of the infrastructure and operation of any modern city. It is essential to provide accurate information of running status of all the vehicles of the public transport to its users. Being able to account for delays in scheduled public transit networks is crucial for public transit operators to perform timetabling and dispatch operations, and for informing passengers about changes in their trips. In addition, handling delays are crucial to a well-oiled transport network. Knowing them in advance allows operators to perform necessary dispatches, as well as make modifications to future timetables to mitigate delay.

As of present, there are large quantities of historical and real-time public transportation data that are readily available, most of which are provided by agencies working with the companies that run these networks. The data includes timetables and live-boards, which tell us when a vehicle has arrived at and departed from a stop, along with delays experienced. Historical data can be utilized to predict the delay of vehicles. This approach can be applied to networks that operate with scheduled transport, such as trains, buses, and flights. There are few solution exist in the art, but they do not predict the delay accurately. There is a lack of a generalizable solution to this problem as of the present

SUMMARY

Embodiments of the present disclosure present technological improvements as solutions to one or more of the above-mentioned technical problems recognized by the inventors in conventional systems. For example, in one embodiment, a system for delay prediction for scheduled public transport. The system comprises a user interface, one or more hardware processors and a memory. The user interface receives historical data corresponding to a plurality of vehicles deployed on a network of the scheduled public transport, wherein a route in the network comprises a queried vehicle for which an expected arrival delay is to be predicted on a current stop. The memory is in communication with the one or more hardware processors, wherein the one or more first hardware processors are configured to execute programmed instructions stored in the one or more first memories, to: derive spatial data, temporal data and spatio-temporal data from the received historical data corresponding to the plurality of vehicles and a plurality of stops present along the route; identify a first window of a set of stops from amongst the plurality of stops, wherein the set of stops are stops from where a trip of the queried vehicle has already completed; identify a second window of a set of vehicles of the current stop, wherein the set of vehicles of the current stop has passed through all the stops in the first window before the queried vehicle, wherein the set of vehicles are of a same mode that are in the second window based on a type of methods, wherein the type of methods comprises: a route-based method, where the set of vehicles of the same mode has covered the same set of stops as the queried vehicle before the queried vehicle, and a trip-based method, where the set of vehicles of the same mode has covered the same set of stops in the first window considered as the queried vehicle before the queried vehicle; extract a plurality of spatial features for each stop in the first window; form a spatial feature vector of a dimension of twice the number of stops in the first window using the plurality of spatial features; extract a plurality of temporal features for each stop in the first window covered by the vehicles in the second window; form a temporal feature vector using the plurality of temporal features; form a spatio-temporal feature vector using a plurality of spatio-temporal features; generate a first architecture of Fully Connected Neural Network (FCNN), using the spatial feature vector; generate a second architecture of a Long Short Term Memory (LSTM) network using the temporal feature vector; generate a third architecture of a 3D Convolutional Neural Network (3DCNN) using the spatio-temporal feature vector; training a plurality of final encoding models provided in a plurality of combinations of the first architecture, the second architecture and the third architecture; choose a final encoding model from amongst the plurality of final encoding model based on accuracy of each of the plurality of final encoding models; and predicting a delay for the queried vehicle at the current stop using the final encoding model.

In another aspect, a method for delay prediction for scheduled public transport. Initially, historical data corresponding to a plurality of vehicles deployed on a network of the scheduled public transport is received via a user interface, wherein a route in the network having a queried vehicle for which an expected arrival delay is to be predicted on a current stop. In the next step, spatial data, temporal data and spatio-temporal data are derived from the received historical data corresponding to the plurality of vehicles and a plurality of stops present along the route. Further, a first window of a set of stops is identified from amongst the plurality of stops, wherein the set of stops are stops from where a trip of the queried vehicle has already completed. In the next step, a second window of a set of vehicles of the current stop is identified, wherein the set of vehicles of the current stop has passed through all the stops in the first window before the queried vehicle, wherein the set of vehicles are of a same mode that are in the second window based on a type of methods, wherein the type of methods comprise: a route-based method, where the set of vehicles of the same mode has covered the same set of stops as the queried vehicle before the queried vehicle, and a trip-based method, where the set of vehicles of the same mode has covered the same set of stops in the first window considered as the queried vehicle before the queried vehicle. In the next step, a plurality of spatial features is extracted for each stop in the first window. A spatial feature vector is then formed of a dimension of twice the number of stops in the first window using the plurality of spatial features. In the next step, a plurality of temporal features is extracted for each stop in the first window covered by the vehicles in the second window. A temporal feature vector is then formed using the plurality of temporal features. Further, a spatio-temporal feature vector is also formed using a plurality of spatio-temporal features. In the next step, a first architecture of Fully Connected Neural Network (FCNN) is generated, using the spatial feature vector. A second architecture of a Long Short Term Memory (LSTM) network is generated using the temporal feature vector. And a third architecture of a 3D Convolutional Neural Network (3DCNN) is generated using the spatio-temporal feature vector. In the next step, a plurality of final encoding models provided in a plurality of combinations of the first architecture, the second architecture and the third architecture, is trained. Further, a final encoding model is chosen from amongst the plurality of final encoding models based on accuracy of each of the plurality of final encoding models. And finally, a delay is predicted for the queried vehicle at the current stop using the final encoding model.

In yet another aspect, one or more non-transitory machine-readable information storage mediums comprising one or more instructions which when executed by one or more hardware processors cause delay prediction for scheduled public transport. Initially, historical data corresponding to a plurality of vehicles deployed on a network of the scheduled public transport is received via a user interface, wherein a route on the network having a queried vehicle for which an expected arrival delay is to be predicted on a current stop. In the next step, spatial data, temporal data and spatio-temporal data are derived from the received historical data corresponding to the plurality of vehicles and a plurality of stops present along the route. Further, a first window of a set of stops is identified from amongst the plurality of stops, wherein the set of stops are stops from where a trip of the queried vehicle has already completed. In the next step, a second window of a set of vehicles of the current stop is identified, wherein the set of vehicles of the current stop has passed through all the stops in the first window before the queried vehicle, wherein the set of vehicles are of a same mode that are in the second window based on a type of methods, wherein the type of methods comprise: a route-based method, where the set of vehicles of the same mode has covered the same set of stops as the queried vehicle before the queried vehicle, and a trip-based method, where the set of vehicles of the same mode has covered the same set of stops in the first window considered as the queried vehicle before the queried vehicle. In the next step, a plurality of spatial features is extracted for each stop in the first window. A spatial feature vector is then formed of a dimension of twice the number of stops in the first window using the plurality of spatial features. In the next step, a plurality of temporal features is extracted for each stop in the first window covered by the vehicles in the second window. A temporal feature vector is then formed using the plurality of temporal features. Further, a spatio-temporal feature vector is also formed using a plurality of spatio-temporal features. In the next step, a first architecture of Fully Connected Neural Network (FCNN) is generated, using the spatial feature vector. A second architecture of a Long Short Term Memory (LSTM) network is generated using the temporal feature vector. And a third architecture of a 3D Convolutional Neural Network (3DCNN) is generated using the spatio-temporal feature vector. In the next step, a plurality of final encoding models provided in a plurality of combinations of the first architecture, the second architecture and the third architecture, is trained. Further, a final encoding model is chosen from amongst the plurality of final encoding models based on accuracy of each of the plurality of final encoding models. And finally, a delay is predicted for the queried vehicle at the current stop using the final encoding model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
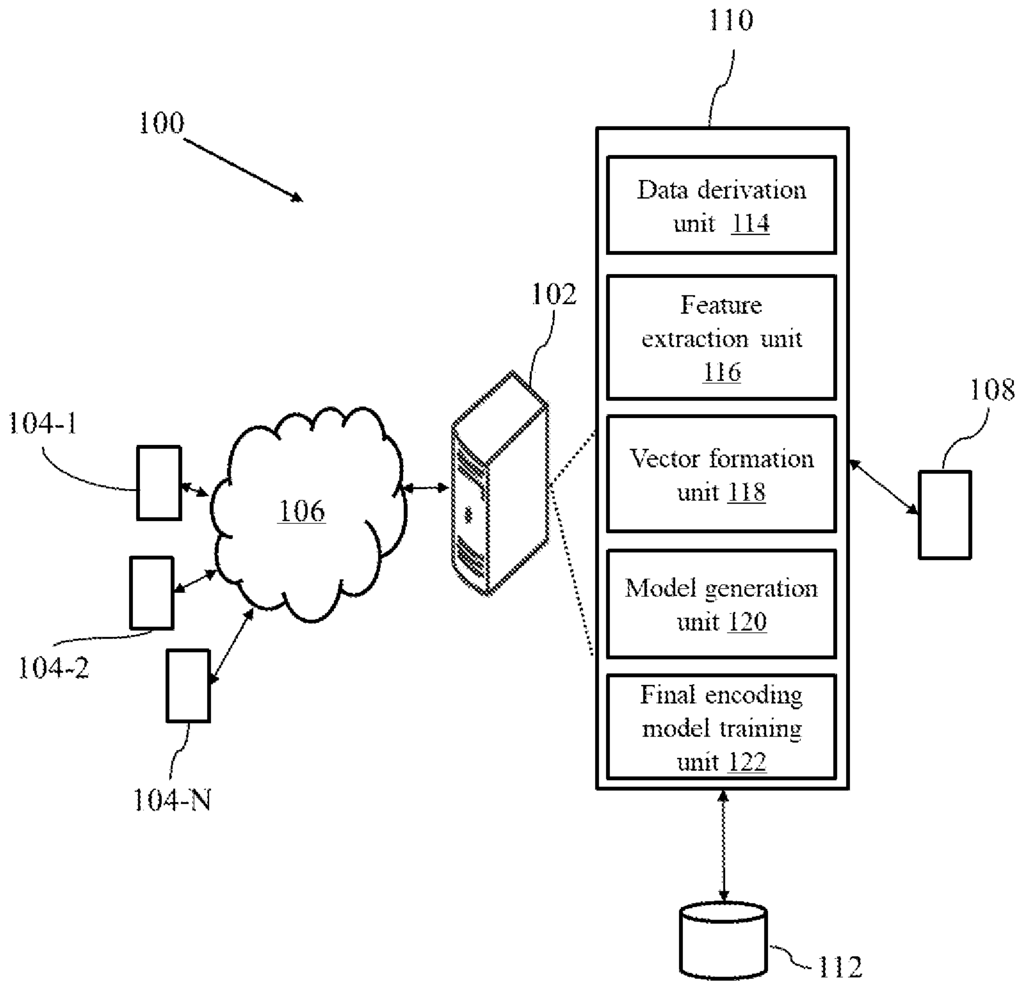
FIG. 1 shows a block diagram of a system for delay prediction for scheduled public transport according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

It is essential to provide accurate information of running status of all the vehicles of the public transport to its users. Being able to account for delays in scheduled public transit networks is crucial for public transit operators to perform timetabling and dispatch operations, and for informing passengers about changes in their trips.

As of present, there are large quantities of historical and real-time public transportation data that are readily available on the internet, most of which are provided by agencies working with the companies that run these networks. The data includes timetables and live-boards, which tell us when a vehicle has arrived at and departed from a stop, along with delays experienced. Historical data can be utilized to predict the delay of vehicles. This approach can be applied to networks that operate with scheduled transport, such as trains, buses, and flights. There are few solution exist in the art, but they do not predict the delay accurately. There is a lack of a generalizable solution to this problem as of the present.

The present disclosure provides a system and method for delay prediction for scheduled public transport. The present disclosure utilizes a novel deep learning technique that learns how to accurately predict delay that a vehicle may experience at stops while on its journey. The deep learning uses a multi-architectural approach that has an added edge over the standard learning approach in the scope of public transit delay prediction. The models are able to predict delays with less than half a minute of error, which is better than the current state of the art and is more than enough for public transit operators to make decisions. The splitting of the features into spatial, temporal and spatio-temporal and the use of the different arrangement of the networks make it unique and testing has proved that the model can be used over a long period of time across a whole network.

The multi-architectural deep learning approach has been used to predict the delays of a queried vehicle in the scheduled public transport. For this, historical operational data is gathered about the public transport in question. The historical operational data is transformed into temporal, and spatiotemporal data. While, the spatial data is obtained from geographical information. From the spatial, and temporal components of the data, the required features are extracted to make the training and testing data sets.

The present disclosure uses different combinations of neural networks architectures that are suited for handling specific types of features. By feeding the features to networks that are suited to handling them and by utilizing these networks together to find the delay value using regression. The regressor model uses a state of the art neural network architecture for delay prediction, in which the neural network is composed of three separate kinds, each of which are good at dealing with a specific kind of data. One component is the Fully Connected Neural Network (FCNN), which is good at learning from static features i.e. the spatial component of the feature vector, the second is the Long Short Term Memory (LSTM) network which is good at learning from temporal features, and the third is the 3D Convolutional Neural Network (3DCNN) which is good at learning from spatiotemporal features. Learned encoding from each are fed to another FCNN to produce the predicted delay value. It should be appreciated that the final prediction is depending upon the architecture. Encodings from one architecture is passed to another or encoding from multiple architectures are combined together to produce the predicted delay value Several variations of the regressor network have been trained with respect to the information flow from one neural network component to another. Once the networks are trained, the regressor can be used to predict for the test data and future inputs. The training data is fed in to the network and a loss function, such as RMSE, is used to evaluate how well the network models the data.

The feature vector needs to be constructed for any future inputs, and then fed into the regressor network, which will then give a prediction for the arrival delay at the current stop. Also, by training on large amounts of data that was collected for a long period of time across a large geography, the solution has been seen to be generalizable.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

According to an embodiment of the disclosure, FIG. 1 illustrates a block diagram a system 100 for delay prediction for scheduled public transport. In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises a data derivation unit 114, a feature extraction unit 116, a vector formation unit 118, a model generation unit 120 and a final encoding model training unit 122 as shown in the block diagram of FIG. 1.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the problem statement can be defined as follows: With the help of following parameters the disclosure is predicting the arrival delay of queried vehicle at the current stop using multi-architectural deep learning models.

- Geospatial information about the stops covered so far by the query vehicle
- Scheduled and actual arrival and departure times of the query vehicle at those stops, and of other vehicles that have passed through the same stops before the query vehicle If the operational data on several vehicular journeys of the same mode through a series of stops $S_1$, $S_2$, . . . $S_n$ is available, then the delay of a queried vehicle of the same mode would experience at a future stop $S_{n+k}$, where k≥1 can be predicted. In the present example, k was chosen to be 1, although one could choose to predict more stops into the future, with varying effect. Also, it is not enough to just know about the queried vehicle and the stops it has covered; it also depends on other vehicles of the same mode that ran through these stops before the current vehicle. The target variable y is the arrival delay experienced by a vehicle at the current stop.

According to an embodiment of the disclosure, the system 100 is configured to receive a historical data corresponding to a plurality of vehicles deployed on a network of the scheduled public transport, wherein a route in the network comprises a queried vehicle for which an expected arrival delay is to be predicted on a current stop.

According to an embodiment of the disclosure, the system 100 comprises the data derivation module 114. The data derivation module 114 is configured to derive spatial data, temporal data and spatio-temporal data from the received historical data corresponding to the plurality of vehicles and a plurality of stops present along the route. The spatial data refers to geospatial information about the stations, such as the distances between any consecutive stations. The temporal data refers to information that ties vehicles of the same mode and stations together, such as the arrival and departure times, as well as the arrival and departure delay experienced at each station. Temporal data is always defined with respect to a vehicle undergoing a trip. The trip for which future delays to be predicted is denoted by $T_0$ and will be referred to as the current vehicle.

According to an embodiment of the disclosure, the system 100 identifies two windows, i.e., a first window and a second window. The first window is of a set of stops from amongst the plurality of stops, wherein the set of stops are stops from where a trip of the queried vehicle has already completed. The second window is of a set of vehicles of the current stop, wherein the set of vehicles of the current stop has passed through all the stops in the first window before the queried vehicle, the set of vehicles are of a same mode that are in the second window based on a type of methods. The type of methods comprises a route-based method and a trip-based method. In the route-based method, the set of vehicles of the same mode has covered the same set of stops as the queried vehicle before the queried vehicle. The trip-based method, where the set of vehicles of the same mode has covered the same set of stops in the first window considered as the queried vehicle before the queried vehicle.

As mentioned earlier, the problem requires that trips by other vehicles of the same mode that have passed through the same stations as $T_0$ are considered to better gauge delays. For this, trip of the vehicle and what stations to inspect need to be defined. To do so, windows/frames over the network's current and previous states are applied. The first window is applied over stations, where for the current stop $S_{n+1}$ whose delay is to be predicted, $S_{(n-w_s)}$, $S_{(n-w_s+1)}$ . . . $S_n$ stations were picked where the trip for the vehicle has already stopped. Data from these stations will be considered later to extract features. The second window determines what trips within the same mode are considered with respect to $T_0$. The route-based and the trip-based are denoted as $$T^r_{wt},\ T^r_{wt-1},\ \ldots \text{ and } T^t_{wt},\ T^t_{wt-1},\ \ldots$$

respectively.

In tandem, the queried vehicle $T_0$ is considered, then stations S is looked, and then features are extracted. In an example, stations in the window are consecutive i.e. one occurs right after the other in the schedule. It should be appreciated that the stations could be picked up in a different way, such as a random set of stations that $T_0$ has covered so far. With respect to a few experiments with this random setup, consecutive stops seem to produce better results. However, in case there isn't data available for a few stops within that sequence, an alternative way of picking up stops may be useful.

According to an embodiment of the disclosure, the system 100 comprises the feature extraction unit 116. The feature extraction unit 116 is configured to extract a plurality of spatial features for each stop in the first window; a plurality of temporal features for each stop in the first window covered by vehicles in the second window, and the plurality of spatio-temporal features.

The plurality of spatial features comprises a distance between two consecutive stops, and a station vehicle capacity. The distance is between the two stops along the path that vehicles take to travel between the two stations. For a stop $S_i$, the distance is calculated between $S_{i-1}$ and $S_i$. It is denoted by dist($S_{i-1}$, $S_i$). The station vehicle capacity captures the physical station capacity for vehicles entering and leaving the station. For trains, this is defined as the number of tracks in a station. For other modes, such as bus, it could be the width of the station indicating how many buses can stop there simultaneously. If no such information exists, this can be left as 0. This is defined with respect $S_i$, and it is denoted by capacity ($S_i$). The spatial features for each stop in the window starting from $S_{n-w_s}$, and the feature vector so formed is denoted by $x_S$, with dimensions of ($2*w_s$).

The plurality of temporal features comprises a scheduled travel time between all consecutive stops in the first window before the current stop, a scheduled dwell time at a stop, and a scheduled interval with preceding vehicle, a scheduled number of stops between a two consecutive stops in the first window. In addition, the plurality of temporal features also comprises the actual value of the travel time between all the consecutive stops before the current stop, the actual dwell time, and the actual interval with preceding vehicle at a stop. Each of the temporal features are computed for the current vehicle as well as the route-based and/or trip-based vehicle, for each stop in the first window.

In an embodiment, the actual travel time takes arrival and departure delays into consideration. For stop $S_i$, travel time is calculated between $S_{i-1}$ and $S_i$. The travel time is difference between the arrival time at stop Si and departure time at stop $S_{i-1}$. The scheduled travel time is a pre-decided time taken by the vehicle between two stops, while the actual travel time is an actual time taken by the vehicle between two stops. For a vehicle V, the scheduled travel time and the actual travel time is denoted by sch_ttime(V, $S_{i-1}$; Si) and act_ttime(V, $S_{i-1}$; $S_i$) respectively. The scheduled dwell time is the difference of the scheduled departure and arrival at a stop. The actual dwell time is the difference of the actual departure and the actual arrival at a stop.

The scheduled dwell time and the actual dwell time is calculated at $S_i$, and is denoted by sch_dtime(V, $S_i$) and act_dtime(V, $S_i$), respectively. For Scheduled/Actual interval with preceding vehicle, a vehicle $V_{pc}$ must be picked which is called as the preceding vehicle. This vehicle stopped at and departed from the stop, right before the vehicle V. The scheduled interval with preceding vehicle is then calculated as the difference of the scheduled departure time of vehicle V at the station, and the scheduled departure time of vehicle $V_{pc}$. The actual interval with preceding vehicle takes into account the departure delay experienced. The scheduled and the actual interval with preceding vehicle is calculated at $S_i$, and is denoted by sch_ptime(V, $V_{pc}$, $S_i$) and act_ptime(V, $V_{pc}$, $S_i$) respectively. The scheduled number of stops are stops that occurred between the two stops in the first window, and is denoted by sstops(V, $S_{i-1}$, $S_i$).

The plurality of spatio-temporal features comprises an arrival delay and a departure delay for each of the plurality of vehicles and for each of the plurality of stops in the first window. The arrival delay is denoted by arr_delay(V, $S_i$). The departure delay is denoted by dep_delay(V, $S_i$).

According to an embodiment of the disclosure, the system 100 comprises the vector formation unit 118. The vector formation unit 118 is configured to form a spatial feature vector ($x_S$) of a dimension of twice the number of stops in the first window using the plurality of spatial features, a temporal feature vector using the plurality of temporal features, and a spatio-temporal feature vector using a plurality of spatio-temporal features.

To form the temporal feature vector, the vehicle is chosen from the second window, and the above temporal features are calculated for each stop in the first window starting from $S_{n-w_s}$. The features are then arranged in the order of route-based vehicles, trip-based vehicle, and then the current vehicle. The feature vector so formed is denoted by $x_T$. It has the dimensions ($7 \times w_s \times w_v$).

To form the spatiotemporal feature vector, the plurality of spatio-temporal features is stacked into cubes. The spatio-temporal feature vector so formed is denoted by $x_{ST}$ and has the dimensions ($4 \times w_s \times w_v \times 1$).

Figure 2:
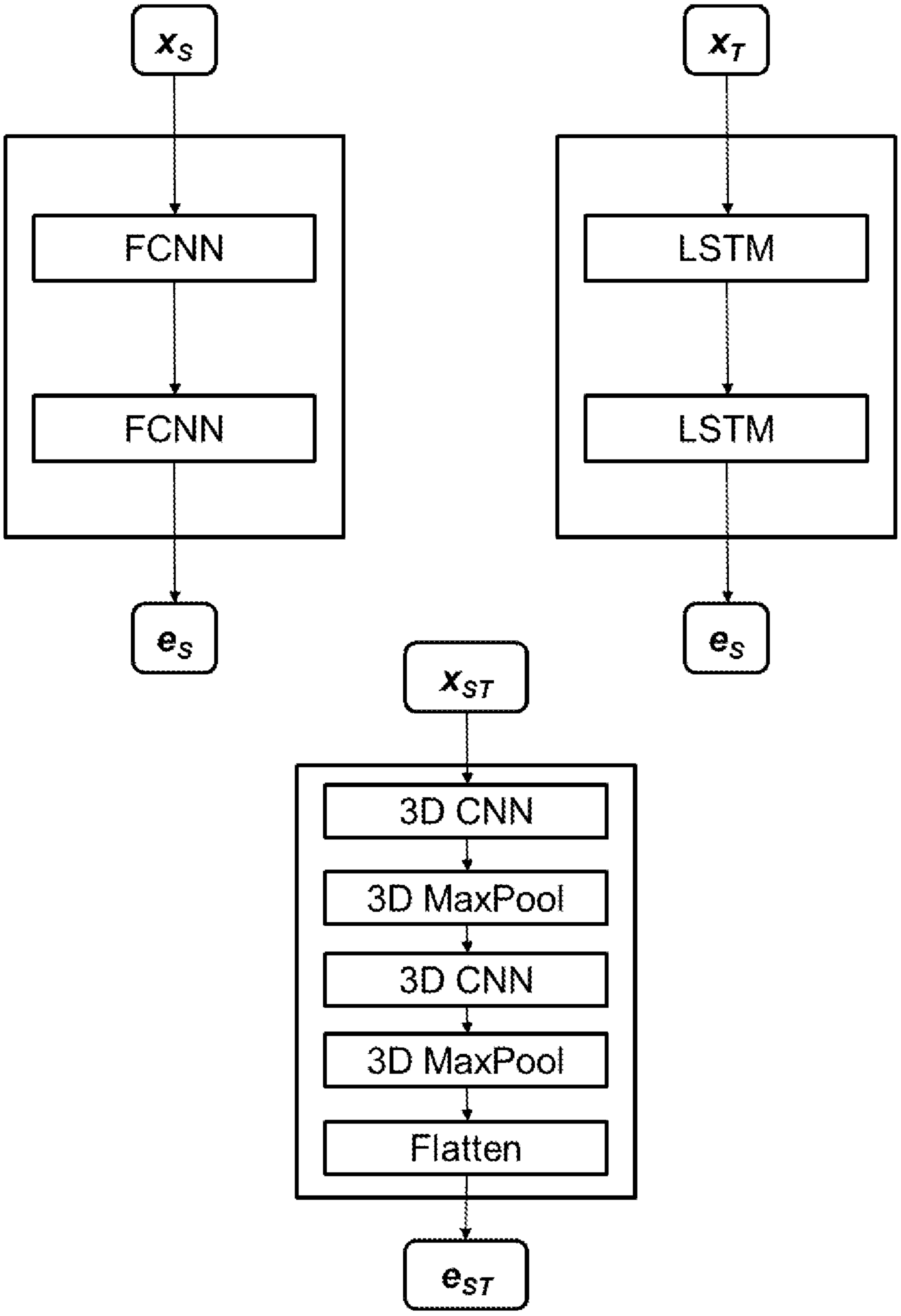
FIG. 2 shows a block diagram of a first architecture of Fully Connected Neural Network (FCNN), a second architecture of a Long Short Term Memory (LSTM) network and a third architecture of a 3D Convolutional Neural Network (3DCNN) according to some embodiments of the present disclosure.
Figure 3A:
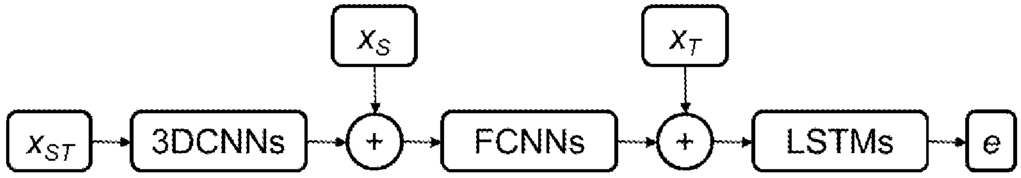
FIGS. 3A, 3B, 3C, 3D, 3E, 3F, and 3G shows a plurality of final encoding models according to some embodiments of the present disclosure.
Figure 3B:
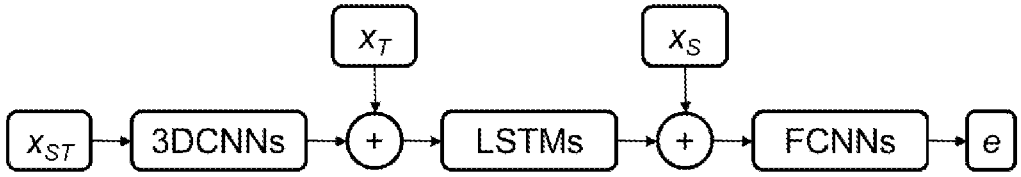
Figure 3C:
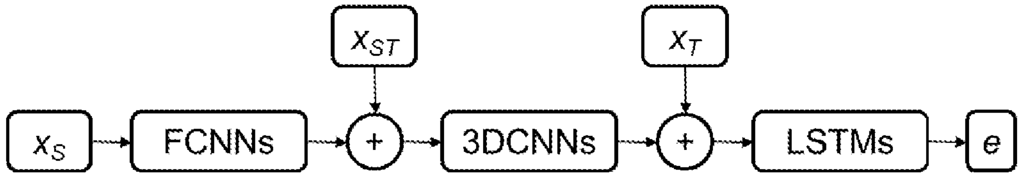
Figure 3D:
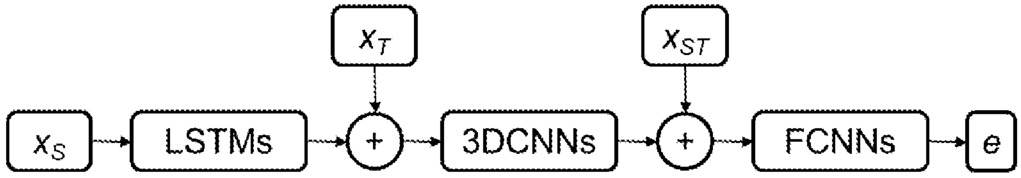
Figure 3E:
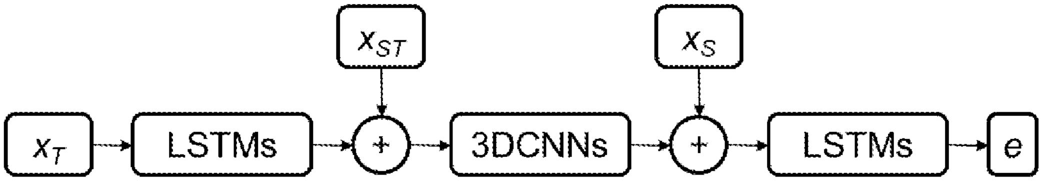
Figure 3F:
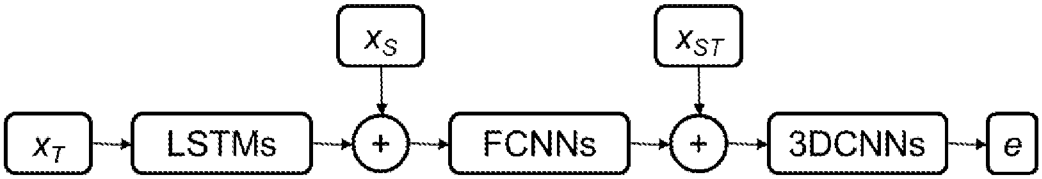
Figure 3G:
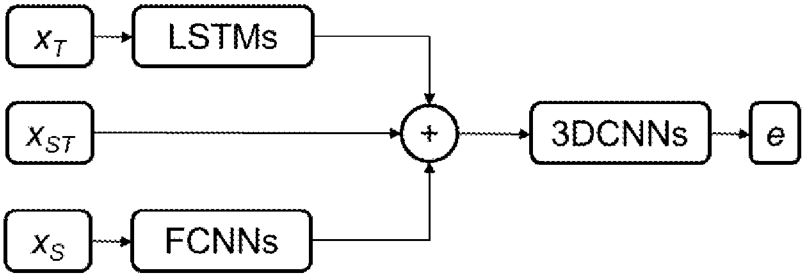

According to an embodiment of the disclosure, the system comprises the model generation module 120. The model generation module 120 is configured to generate a first architecture of Fully Connected Neural Network (FCNN) using the spatial feature vector, a second architecture of a Long Short Term Memory (LSTM) network using the temporal feature vector and a third architecture of a 3D Convolutional Neural Network (3DCNN) using the spatio-temporal feature vector. The block diagrams of the first architecture, the second architecture and the third architecture are shown in FIG. 2. Thus, y is a function of the spatial vector, the temporal vector and the spatio-temporal vector as shown in equation (1).

$$f(x_S, x_T, x_{ST}) = y \quad (1)$$

where y is the delay at the current stop.

Equation (1) above describes a standard regression problem. Given the target variable y and the predicted variable ŷ that the regression model outputs, the goal of the model is to reduce the RMSE/L2 loss using the equation (2).

$$L_{L2} = \sqrt{\frac{1}{n}\sum_{i=1}^{n}(y_i - \hat{y}_i)^2} \quad (2)$$

According to an embodiment of the disclosure, the system 100 comprises the final encoding model training unit 122. The final encoding model training unit 122 is configured to train a plurality of final encoding models provided a plurality of combinations of the first architecture, the second architecture and the third architecture.

FIG. 3A-3G depicts the different model architecture of the plurality of final encoding models according to some embodiment of the present disclosure. In an example a total of seven final encoding models are generated. The architecture can be broken down into three specialized blocks: One consisting of fully connected layers which deal with spatial data, the second consisting of LSTMs which deal with temporal data, and the last consisting of 3D CNNs which deal with spatio-temporal data. The blocks are designed to specifically target these three components. They produce an encoding ex which is further propagated to get ŷ.

Six out of seven are permutations that deal with connecting the specialized blocks in series, whereas the last has two blocks in parallel. The idea is that information from one block may be useful in transforming the feature vector of another block, similar to what happens in residual networks. It is important to note is that the encoding given by each layer has to have a dimension that can be reshaped such that it can be concatenated with the next input feature. For example, in FIG. 3D, the encoding $e_S$ from the FCNN block has to be reshaped into ($7 \times w_s \times w_v$) dimensions in order to be concatenated with $x_T$. At the end of all three blocks, the resultant encoding e is put through another FCNN which then gives ŷ.

According to an embodiment of the disclosure, the system 100 is configured to choose a final encoding model from amongst the plurality of final encoding model based on accuracy of each of the plurality of final encoding models. It should be appreciated that in an example, a mean accuracy error can be calculated to check the accuracy of the models. And the delay for the queried vehicle is predicted at the current stop using the chosen final encoding model.

Figure 4A:
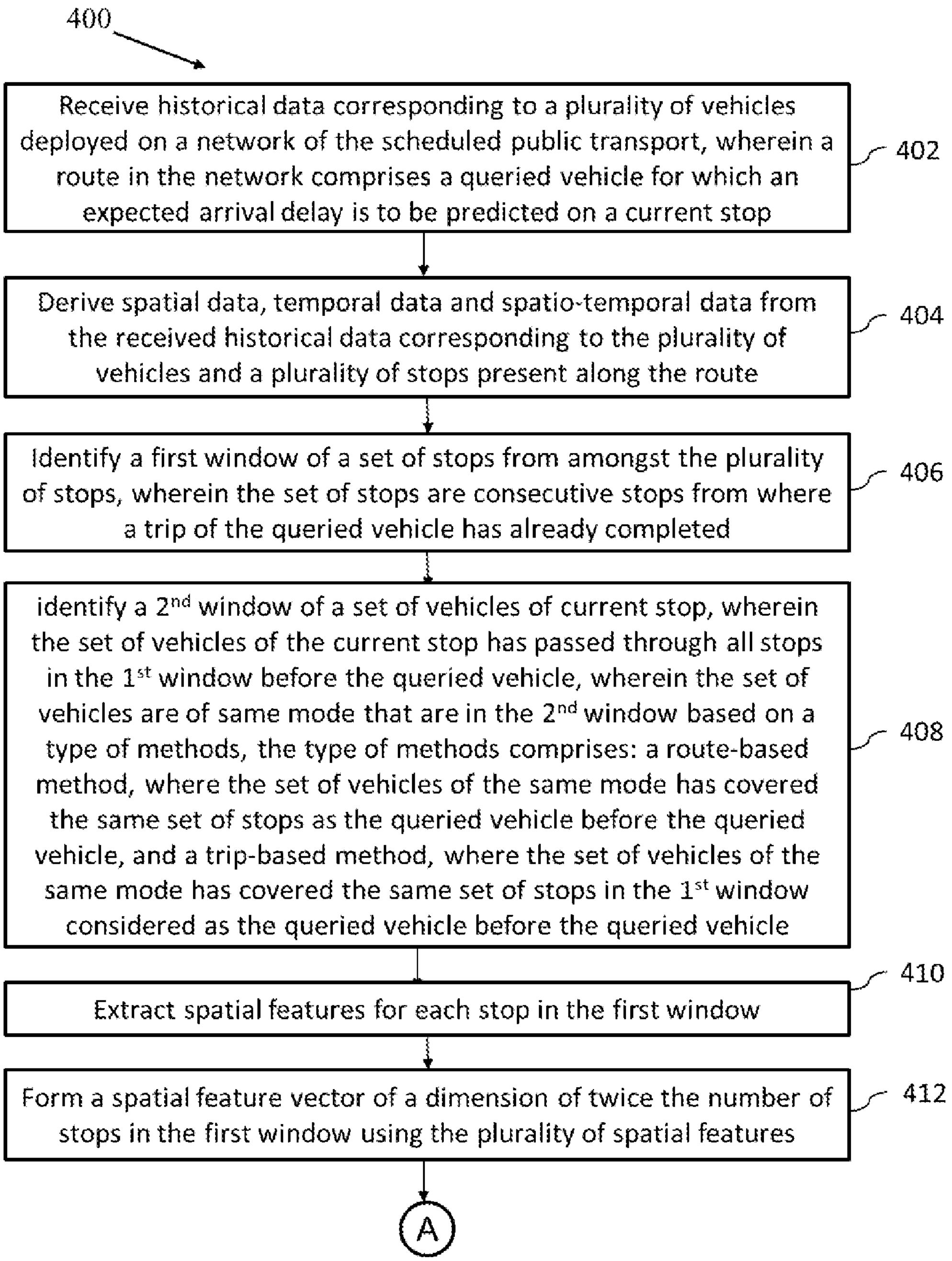
FIGS. 4A-4B show a flowchart of a method for delay prediction for scheduled public transport according to some embodiments of the present disclosure.
Figure 4B:
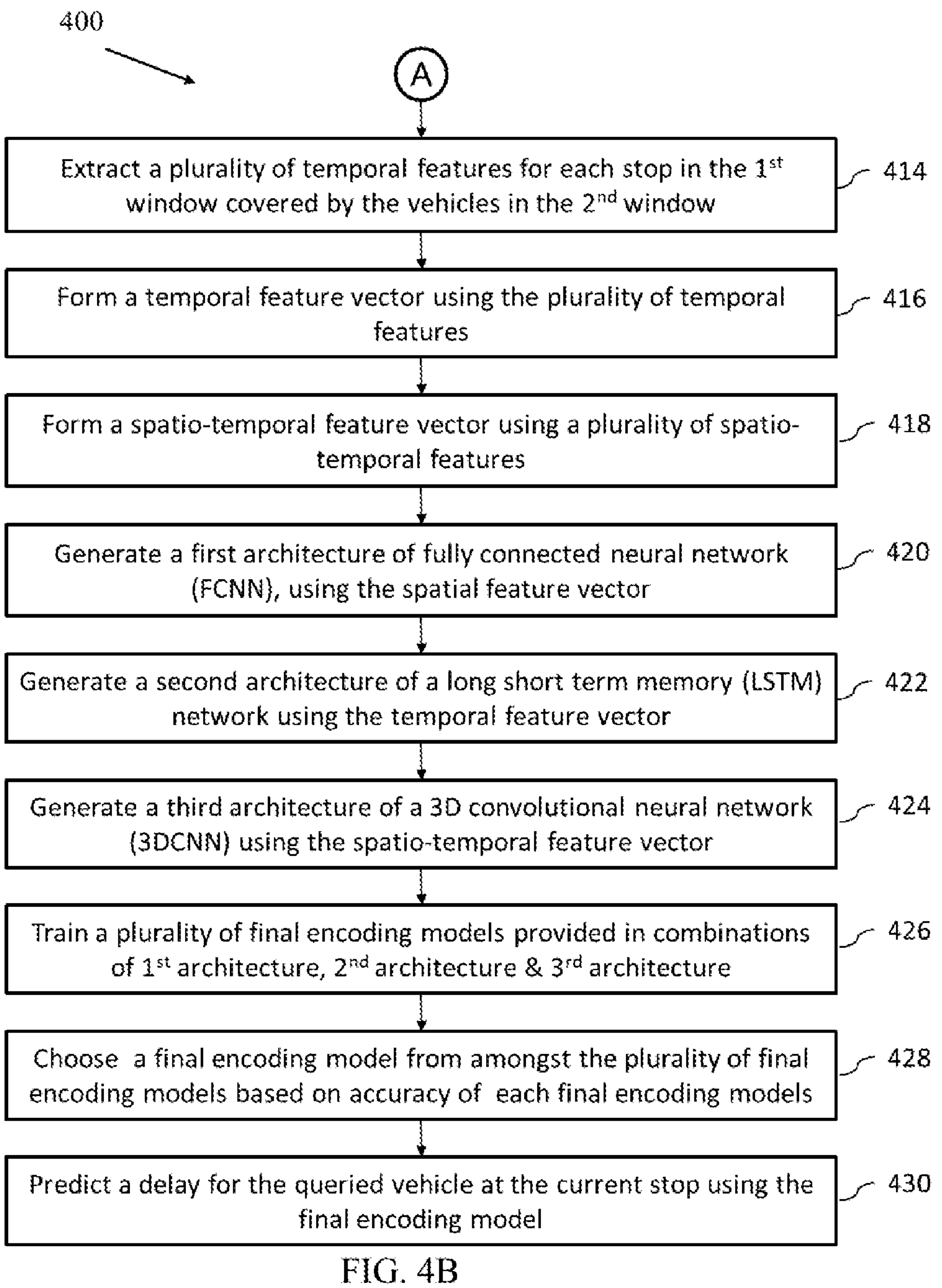

FIG. 4A-4B illustrates a flow chart of a method 400 for delay prediction for scheduled public transport, in accordance with an example embodiment of the present disclosure. The method 400 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 100. However, the operations of the method 400 can be described and/or practiced by using any other system.

Initially at step 402 of the method 400, historical data is received corresponding to a plurality of vehicles deployed on a network of the scheduled public transport, wherein a route in the network comprises the queried vehicle for which an expected arrival delay is to be predicted on a current stop. In the next step 404, spatial data, temporal data and spatio-temporal data is derived from the received historical data corresponding to the plurality of vehicles and a plurality of stops present along the route.

At step 406 of the method 400, the first window of a set of stops is identified from amongst the plurality of stops, wherein the set of stops are stops from where a trip of the queried vehicle has already completed. At step 408, the second window of the set of vehicles of the current stop is identified, wherein the set of vehicles of the current stop has passed through all the stops in the first window before the queried vehicle, wherein the set of vehicles are of a same mode that are in the second window based on a type of methods. The type of methods comprises a route-based method and a trip-based method. The route-based method is where the set of vehicles of the same mode has covered the same set of stops as the queried vehicle before the queried vehicle. The trip-based method, where the set of vehicles of the same mode has covered the same set of stops in the first window considered as the queried vehicle before the queried vehicle.

At step 410 of the method 400, the plurality of spatial features is extracted for each stop in the first window. Further at step 412, the spatial feature vector of a dimension of twice the number of stops in the first window is formed using the plurality of spatial features. At step 414, the plurality of temporal features is extracted for each vehicle in the second window. Further at step 416, the temporal feature vector is formed using the plurality of temporal features. In the next step 418, the spatio-temporal feature vector is formed using a plurality of spatio-temporal features.

Further at step 420 of the method 400, the first architecture of Fully Connected Neural Network (FCNN) is generated using the spatial feature vector. At step 422 the second architecture of a Long Short Term Memory (LSTM) network is generated using the temporal feature vector. And at step 424, the third architecture of a 3D Convolutional Neural Network (3DCNN) is generated using the spatio-temporal feature vector.

At step 426 of the method 400, the plurality of final encoding models provided in the plurality of combinations of the first architecture, the second architecture and the third architecture, is trained. At step 428, the final encoding model is chosen from amongst the plurality of final encoding model based on accuracy of each of the plurality of final encoding models. And finally, at step 430, the delay is predicted for the queried vehicle at the current stop using the final encoding model.

According to an embodiment of the disclosure, the system 100 can also be explained with the help of experimental results.

Data was obtained from Infrabel's Open data raw punctuality data, which provides liveboard data for each year. It contains information on what trains arrived at and departed from a station, and also the geographical information that could be retrieved from a service provider or OpenGIS data. 2018 data was used for training, and 2019 data used for testing. The data was first rearranged into a required format, where the schedule is chunked into overlapping $w_s$ sized stop information for each train in the dataset. Because of the following reasons, a few chunks had to be removed from the data. Like, instances of negative or zero actual travel time, instances of negative actual dwell time, missing geographical information and negative arrival, or departure, delays.

Erroneous information in the dataset paved way for the first three kinds of removal. Windows with negative delay were removed as predicting positive delay is of interest, which is more detrimental. Once cleaned, the windows are then processed for each feature vector. To obtain $x_T$ and $x_{ST}$, the previous trip-based and/or route-based trains need to be found, which can be done by comparing the current train's window of information with other windows in the data that have the same set of stops.

For the purposes of the present experiments, the window sizes are $w_s \in \{3, 5\}$ and $w_t \in \{3, 5\}$. For $w_t=3$, either the route-based or trip-based trains were taken, but not both. Each of the architectures present in TABLE 1 were trained for 60 epochs each with the Adam optimizer. The hyper parameters were tuned after multiple runs.

The present model while being more generalizable is also trained on a much larger network than other existing methods, most of which are trained on single corridors. Therefore, the present model performs better considering the scope of the setting. The mean absolute error (MAE) obtained for the various configurations and models have been listed in TABLE 1.

TABLE 1

| Encoder-decoder Architecture | $w_s$ | $w_t$ | Type of trains | Mean absolute error |
|---|---|---|---|---|
| STSpaTem | 3 | 3 | Route | 0.481 |
| | 3 | 3 | Trip | 0.462 |
| | 3 | 5 | Both | 0.482 |
| | 5 | 3 | Route | 0.45 |
| | 5 | 3 | Trip | 0.49 |
| | 5 | 5 | Both | 0.473 |
| SSpaTemT | 3 | 3 | Route | 0.438 |
| | 3 | 3 | Trip | 0.447 |
| | 3 | 5 | Both | 0.439 |
| | 5 | 3 | Route | 0.475 |
| | 5 | 3 | Trip | 0.473 |
| | 5 | 5 | Both | 0.46 |
| SpaTemTS | 3 | 3 | Route | 0.459 |
| | 3 | 3 | Trip | 0.455 |
| | 3 | 5 | Both | 0.454 |
| | 5 | 3 | Route | 0.484 |
| | 5 | 3 | Trip | 0.48 |
| | 5 | 5 | Both | 0.482 |
| SpaTemST | 3 | 3 | Route | 0.438 |
| | 3 | 3 | Trip | 0.444 |
| | 3 | 5 | Both | 0.436 |
| | 5 | 3 | Route | 0.462 |
| | 5 | 3 | Trip | 0.461 |
| | 5 | 5 | Both | 0.476 |
| TSpaTemS | 3 | 3 | Route | 0.44 |
| | 3 | 3 | Trip | 0.437 |
| | 3 | 5 | Both | 0.437 |
| | 5 | 3 | Route | 0.458 |
| | 5 | 3 | Trip | 0.446 |
| | 5 | 5 | Both | 0.448 |
| TSSpaTem | 3 | 3 | Route | 0.402 |
| | 3 | 3 | Trip | 0.398 |
| | 5 | 3 | Trip | 0.417 |
| | 5 | 5 | Both | 0.413 |
| TSSpaTem Parallel | 3 | 3 | Route | 0.406 |
| | 3 | 3 | Trip | 0.411 |
| | 5 | 3 | Route | 0.424 |
| | 5 | 5 | Both | 0.4 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related to accurate prediction of a vehicle in a scheduled public transport. The embodiment thus provides a method and a system for delay prediction for scheduled public transport.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for delay prediction for scheduled public transport, the method comprising:

receiving, via a user interface, historical operation data corresponding to a plurality of vehicles deployed in a network of the scheduled public transport, wherein a route in the network having a queried vehicle for which an expected arrival delay is to be predicted on a current stop;

transforming, via one or more hardware processors, the received historical operation data into temporal data and spatio-temporal data;

obtaining, via one or more hardware processors, a spatial data from geographical information corresponding to the plurality of vehicles deployed in the network of the scheduled public transport;

identifying, via the one or more hardware processors, a first window of a set of stops from amongst the plurality of stops, wherein the set of stops are stops from where a trip of the queried vehicle has already completed;

identifying, via the one or more hardware processors, a second window of a set of vehicles of the current stop, wherein the set of vehicles of the current stop has passed through all the stops in the first window before the queried vehicle, wherein the set of vehicles are of a same mode that are in the second window based on type of vehicles, wherein the type of vehicles comprise: 1) route-based vehicles, where the set of vehicles of the same mode has covered the same set of stops as the queried vehicle before the queried vehicle, and 2) trip-based vehicles, where the set of vehicles of the same mode has covered the same set of stops in the first window considered as the queried vehicle before the queried vehicle;

extracting, via the one or more hardware processors, a plurality of spatial features for each stop in the first window, wherein the plurality of spatial features comprises a distance between two consecutive stops, and a station vehicle capacity;

forming, via the one or more hardware processors, a spatial feature vector of a dimension of twice the number of stops in the first window using the plurality of spatial features;

extracting, via the one or more hardware processors, a plurality of temporal features for each stop in the first window covered by vehicles in the second window, wherein the plurality of temporal features comprises a scheduled travel time between all consecutive stops in the first window before the current stop, a scheduled dwell time at a stop, a scheduled interval with preceding vehicle, a scheduled number of stops between a two consecutive stops in the first window, an actual travel time, an actual dwell time, and an actual interval with preceding vehicle for all consecutive stops in the first window;

forming, via the one or more hardware processors, a temporal feature vector using the plurality of temporal features, wherein the vehicle is chosen from the second window to form the temporal feature vector and wherein each of the temporal features are computed for the current vehicle, the route-based and/or trip-based vehicle, for each stop in the first window;

forming, via the one or more hardware processors, a spatio-temporal feature vector using a plurality of spatio-temporal features, wherein the plurality of spatio-temporal features comprises an arrival delay and a departure delay for each of the plurality of vehicles and for each of the plurality of stops;

training, via the one or more hardware processors, a first architecture of Fully Connected Neural Network (FCNN), using the spatial feature vector;

training, via the one or more hardware processors, a second architecture of a Long Short Term Memory (LSTM) network using the temporal feature vector;

training, via the one or more hardware processors, a third architecture of a 3D Convolutional Neural Network using the spatio-temporal feature vector, wherein a function of the spatial feature vector, the temporal feature vector and the spatio-temporal feature vector represented as a standard regression problem given by $f(x_s, x_T, x_{ST})=y$;

training a regressor network with respect to information flow between first, second and third architecture networks to obtain a loss function, wherein loss is reduced using target variable "y" and the predicted variable "y" obtained from the standard regression problem using and constructing a feature vector for a plurality of future inputs and feeding the regressor network with the feature vector for the plurality of future inputs;

training, via the one or more hardware processors, a plurality of final encoding models provided in a plurality of combinations of the first architecture, the second architecture and the third architecture, wherein encodings from the first, second and third architecture networks are combined together, wherein the plurality of combinations comprises seven combinations including six combinations have permutation dealing with connecting the first architecture, the second architecture and the third architecture in series and one combination has two models in parallel and one in series;

choosing, via the one or more hardware processors, a final encoding model from amongst the plurality of final encoding models based on accuracy of each of the plurality of final encoding models to predict the delay for the queried vehicle at the current stop, wherein a mean accuracy error is calculated to check the accuracy of the plurality of final encoding models and wherein the loss function obtained from the regression network is used to evaluate the plurality of final encoding models; and predicting, via the one or more hardware processors, a delay for the queried vehicle at the current stop using the final encoding model.

2. The processor implemented method of claim 1 wherein, the plurality of temporal features is arranged in the order of route-based vehicles, trip-based vehicles, and the queried vehicle, wherein the arrangement results in the formation of the temporal feature vector.

3. A system for delay prediction for scheduled public transport, the system comprises:

a user interface;

one or more hardware processors;

a memory in communication with the one or more hardware processors and the user interface, wherein the one or more first hardware processors are configured to execute programmed instructions stored in the one or more first memories, to:

receive historical operation data corresponding to a plurality of vehicles deployed on a network of the scheduled public transport, wherein a route in the network having a queried vehicle for which an expected arrival delay is to be predicted on a current stop;

transform the received historical operation data into temporal data and spatio-temporal data;

obtain a spatial data from geographical information corresponding to the plurality of vehicles deployed in the network of the scheduled public transport;

identify a first window of a set of stops from amongst the plurality of stops, wherein the set of stops are stops from where a trip of the queried vehicle has already completed;

identify a second window of a set of vehicles of the current stop, wherein the set of vehicles of the current stop has passed through all the stops in the first window before the queried vehicle, wherein the set of vehicles are of a same mode that are in the second window based on type of vehicles, wherein the type of vehicles comprises:

route-based vehicles, where the set of vehicles of the same mode has covered the same set of stops as the queried vehicle before the queried vehicle, and trip-based vehicles, where the set of vehicles of the same mode has covered the same set of stops in the first window considered as the queried vehicle before the queried vehicle;

extract a plurality of spatial features for each stop in the first window, wherein the plurality of spatial features comprises a distance between two consecutive stops, and a station vehicle capacity;

form a spatial feature vector of a dimension of twice the number of stops in the first window using the plurality of spatial features;

extract a plurality of temporal features for each stop in the first window covered by vehicles in the second window, wherein the plurality of temporal features comprises a scheduled travel time between all consecutive stops in the first window before the current stop, a scheduled dwell time at a stop, a scheduled interval with preceding vehicle, a scheduled number of stops between a two consecutive stops in the first window, an actual travel time, an actual dwell time, and an actual interval with preceding vehicle for all consecutive stops in the first window;

form a temporal feature vector using the plurality of temporal features, wherein the vehicle is chosen from the second window to form the temporal feature vector and wherein each of the temporal features are computed for the current vehicle, the route-based and/or trip-based vehicle, for each stop in the first window;

form a spatio-temporal feature vector using a plurality of spatio-temporal features, wherein the plurality of spatio-temporal features is stacked into cubes, wherein the plurality of spatio-temporal features comprises an arrival delay and a departure delay for each of the plurality of vehicles and for each of the plurality of stops;

train a first architecture of Fully Connected Neural Network (FCNN), using the spatial feature vector;

train a second architecture of a Long Short Term Memory (LSTM) network using the temporal feature vector;

train a third architecture of a 3D Convolutional Neural Network using the spatio-temporal feature vector, wherein a function of the spatial feature vector, the temporal feature vector and the spatio-temporal feature vector represented as a standard regression problem given by $f(x_S, x_T, x_{ST})=y$;

training a regressor network with respect to information flow between first, second and third architecture networks to obtain a loss function wherein loss is reduced using target variable "y" and the predicted variable "y" obtained from the standard regression problem using and constructing a feature vector for plurality of future inputs and feeding the regressor network with the feature vector for plurality of future inputs;

train a plurality of final encoding models provided in a plurality of combinations of the first architecture, the second architecture and the third architecture, wherein encodings from the first, second and third architecture networks are combined together, wherein the plurality of combinations comprises seven combinations including six combinations have permutation dealing with connecting the first architecture, the second architecture and the third architecture in series and one combination has two models in parallel and one in series;

choose a final encoding model from amongst the plurality of final encoding models based on accuracy of each of the plurality of final encoding models to predict the delay for the queried vehicle at the current stop, wherein a mean accuracy error is calculated to check the accuracy of the plurality of final encoding models and wherein the loss function obtained from the regression network is used to evaluate the plurality of final encoding models; and predicting a delay for the queried vehicle at the current stop using the final encoding model.

4. One or more non-transitory machine-readable information storage mediums comprising one or more instructions which when executed by one or more hardware processors cause:

receiving, via a user interface, historical operation data corresponding to a plurality of vehicles deployed in a network of the scheduled public transport, wherein a route in the network having a queried vehicle for which an expected arrival delay is to be predicted on a current stop;

transforming the received historical operation data into temporal data and spatio-temporal data;

identifying a first window of a set of stops from amongst the plurality of stops, wherein the set of stops are stops from where a trip of the queried vehicle has already completed;

obtaining a spatial data from geographical information corresponding to the plurality of vehicles deployed in the network of the scheduled public transport;

identifying a second window of a set of vehicles of the current stop, wherein the set of vehicles of the current stop has passed through all the stops in the first window before the queried vehicle, wherein the set of vehicles are of a same mode that are in the second window based on type of vehicles, wherein the type of vehicles comprise:

route-based vehicles, where the set of vehicles of the same mode has covered the same set of stops as the queried vehicle before the queried vehicle, and trip-based vehicles, where the set of vehicles of the same mode has covered the same set of stops in the first window considered as the queried vehicle before the queried vehicle;

extracting a plurality of spatial features for each stop in the first window, wherein the plurality of spatial features comprises a distance between two consecutive stops, and a station vehicle capacity;

forming a spatial feature vector of a dimension of twice the number of stops in the first window using the plurality of spatial features;

extracting a plurality of temporal features for each stop in the first window covered by vehicles in the second window, wherein the plurality of temporal features comprises a scheduled travel time between all consecutive stops in the first window before the current stop, a scheduled dwell time at a stop, a scheduled interval with preceding vehicle, a scheduled number of stops between a two consecutive stops in the first window, an actual travel time, an actual dwell time, and an actual interval with preceding vehicle for all consecutive stops in the first window;

forming a temporal feature vector using the plurality of temporal features, wherein the vehicle is chosen from the second window to form the temporal feature vector and wherein each of the temporal features are computed for the current vehicle, the route-based and/or trip-based vehicle, for each stop in the first window;

forming a spatio-temporal feature vector using a plurality of spatio-temporal features, wherein the plurality of spatio-temporal features is stacked into cubes, wherein the plurality of spatio-temporal features comprises an arrival delay and a departure delay for each of the plurality of vehicles and for each of the plurality of stops;

training a first architecture of Fully Connected Neural Network (FCNN), using the spatial feature vector;

training a second architecture of a Long Short Term Memory (LSTM) network using the temporal feature vector;

training a third architecture of a 3D Convolutional Neural Network using the spatio-temporal feature vector, wherein a function of the spatial feature vector, the temporal feature vector and the spatio-temporal feature vector represented as a standard regression problem given by $f(x_S, x_T, x_{ST})=y$;

training a regressor network with respect to information flow between first, second and third architecture networks to obtain a loss function wherein loss is reduced using target variable "y" and the predicted variable "y" obtained from the standard regression problem using and constructing a feature vector for plurality of future inputs and feeding the regressor network with the feature vector for plurality of future inputs training a plurality of final encoding models provided in a plurality of combinations of the first architecture, the second architecture and the third architecture, wherein encodings from the first, second and third architecture networks are combined together, wherein the plurality of combinations comprises seven combinations including six combinations have permutation dealing with connecting the first architecture, the second architecture and the third architecture in series and one combination has two models in parallel and one in series;

choosing a final encoding model from amongst the plurality of final encoding models based on accuracy of each of the plurality of final encoding models to predict the delay for the queried vehicle at the current stop, wherein a mean accuracy error is calculated to check the accuracy of the plurality of final encoding models and wherein the loss function obtained from the regression network is used to evaluate the plurality of final encoding models; and predicting a delay for the queried vehicle at the current stop using the final encoding model.

5. The one or more non-transitory machine-readable information storage mediums of claim 4 wherein, the plurality of temporal features is arranged in the order of route-based vehicles, trip-based vehicles, and the queried vehicle, wherein the arrangement results in the formation of the temporal feature vector.

* * * * *